US010038629B2

(12) United States Patent
Fang et al.

(10) Patent No.: US 10,038,629 B2
(45) Date of Patent: *Jul. 31, 2018

(54) VIRTUAL MACHINE MIGRATION USING LABEL BASED UNDERLAY NETWORK FORWARDING

(71) Applicant: Microsoft Technology Licensing, LLC, Redmond, WA (US)

(72) Inventors: Luyuan Fang, Holmdel, NJ (US); Fabio Chiussi, Holmdel, NJ (US); Vijay Gill, Bellevue, WA (US); Deepak Bansal, Sammamish, WA (US); Jeff Cox, Fall City, WA (US); Nasser Elaawar, Seattle, WA (US); Gary Ratterree, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/555,877

(22) Filed: Nov. 28, 2014

(65) Prior Publication Data

US 2016/0117185 A1   Apr. 28, 2016

Related U.S. Application Data

(60) Provisional application No. 62/068,710, filed on Oct. 26, 2014.

(51) Int. Cl.
*G06F 9/455* (2018.01)
*G06F 9/48* (2006.01)
(Continued)

(52) U.S. Cl.
CPC .......... *H04L 45/50* (2013.01); *G06F 9/45558* (2013.01); *G06F 9/4856* (2013.01);
(Continued)

(58) Field of Classification Search
CPC ............... G06F 9/45558; G06F 9/4856; G06F 2009/4557; G06F 2009/45595;
(Continued)

(56) References Cited

U.S. PATENT DOCUMENTS

| 5,493,716 | A | 2/1996 | Bane |
| 7,095,740 | B1 | 8/2006 | Jagannath et al. |

(Continued)

FOREIGN PATENT DOCUMENTS

| EP | 1962192 A1 | 8/2008 |
| WO | 2012168795 A1 | 12/2012 |
| WO | 2013184846 A1 | 12/2013 |

OTHER PUBLICATIONS

Dam et al, Location Independent Routing in Process Network Overlays, 2014, IEEE, 2014 22nd Euromicro International Conference on Parallel, Distributed, and Network-Based Processing, pp. 715-724.*

(Continued)

*Primary Examiner* — Abu Zar Ghaffari
(74) *Attorney, Agent, or Firm* — Liang IP, PLLC

(57) ABSTRACT

Various techniques for migrating virtual entities via a label based underlay network is disclosed herein. In one embodiment, a method includes receiving packets associated with migrating a virtual machine from an originating network node of the underlay network to a target network node of the underlay network. The received packets individually include a label associated with a network path from the originating network node to the target network node in the underlay network. In response to receiving the packets, the method includes examining the labels of the packets to determine the network paths associated the labels and forwarding the packets following the determined network paths in the underlay network.

20 Claims, 5 Drawing Sheets

(51) Int. Cl.
*H04L 29/08* (2006.01)
*H04L 12/723* (2013.01)
*H04L 12/911* (2013.01)
H04L 12/28 (2006.01)
H04L 12/781 (2013.01)
H04L 12/701 (2013.01)

(52) U.S. Cl.
CPC .... *H04L 47/825* (2013.01); *G06F 2009/4557* (2013.01); *G06F 2009/45595* (2013.01); *H04L 12/28* (2013.01); *H04L 45/00* (2013.01); *H04L 45/52* (2013.01)

(58) Field of Classification Search
CPC . H04L 67/10; H04L 67/1038; H04L 12/5689; H04L 47/825; H04L 12/28; H04L 45/50; H04L 45/52
See application file for complete search history.

(56) References Cited

U.S. PATENT DOCUMENTS

| | | | |
|---|---|---|---|
| 7,346,279 B1 | 3/2008 | Li et al. | |
| 7,580,399 B2 | 8/2009 | Hart | |
| 7,974,220 B2 | 7/2011 | Elias et al. | |
| 7,996,510 B2 | 8/2011 | Vicente | |
| 8,233,489 B2 | 7/2012 | Welin et al. | |
| 8,473,557 B2 | 6/2013 | Ramakrishnan et al. | |
| 8,553,663 B2 | 10/2013 | Harmatos et al. | |
| 8,645,576 B2 | 2/2014 | Farinacci et al. | |
| 8,705,513 B2 | 4/2014 | Van Der Merwe et al. | |
| 8,730,980 B2 | 5/2014 | Bagepalli et al. | |
| 8,804,745 B1 | 8/2014 | Sinn | |
| 8,966,027 B1 | 2/2015 | Brandwine et al. | |
| 8,984,114 B2* | 3/2015 | Shieh | H04L 63/20 370/338 |
| 2007/0060150 A1 | 3/2007 | Hart | |
| 2007/0104119 A1 | 5/2007 | Sarkar et al. | |
| 2007/0180436 A1* | 8/2007 | Travostino | G06F 9/4856 717/138 |
| 2009/0037607 A1 | 2/2009 | Farinacci et al. | |
| 2010/0214944 A1* | 8/2010 | Elias | H04L 45/50 370/252 |
| 2010/0287548 A1* | 11/2010 | Zhou | G06F 9/4856 709/226 |
| 2010/0322255 A1* | 12/2010 | Hao | G06F 9/45558 370/398 |
| 2012/0224583 A1* | 9/2012 | Sergeev | H04L 12/413 370/395.5 |
| 2013/0031544 A1* | 1/2013 | Sridharan | G06F 11/203 718/1 |
| 2013/0034094 A1 | 2/2013 | Cardona et al. | |
| 2013/0047151 A1 | 2/2013 | Sridharan et al. | |
| 2013/0086298 A1 | 4/2013 | Alanis et al. | |
| 2013/0129348 A1 | 5/2013 | Mak et al. | |
| 2013/0198558 A1 | 8/2013 | Rao et al. | |
| 2013/0223454 A1 | 8/2013 | Dunbar et al. | |
| 2013/0227108 A1 | 8/2013 | Dunbar et al. | |
| 2013/0238802 A1 | 9/2013 | Sarikaya | |
| 2013/0262647 A1* | 10/2013 | Kurita | G06F 9/54 709/223 |
| 2014/0006585 A1 | 1/2014 | Dunbar et al. | |
| 2014/0037032 A1 | 2/2014 | Yan et al. | |
| 2014/0068045 A1 | 3/2014 | Tarui et al. | |
| 2014/0071990 A1 | 3/2014 | Banavalikar et al. | |
| 2014/0086253 A1 | 3/2014 | Yong | |
| 2014/0108584 A1 | 4/2014 | Lu | |
| 2014/0112349 A1 | 4/2014 | Moreno et al. | |
| 2014/0161131 A1 | 6/2014 | Yang et al. | |
| 2014/0195666 A1 | 7/2014 | Dumitriu et al. | |
| 2014/0201733 A1 | 7/2014 | Benny et al. | |
| 2014/0215010 A1* | 7/2014 | Liang | H04L 45/04 709/217 |
| 2014/0229944 A1 | 8/2014 | Wang et al. | |
| 2014/0241247 A1* | 8/2014 | Kempf | H04L 12/4633 370/328 |
| 2014/0244851 A1 | 8/2014 | Lee | |
| 2014/0269712 A1* | 9/2014 | Kidambi | H04L 12/4633 370/392 |
| 2015/0052521 A1* | 2/2015 | Raghu | H04L 63/0272 718/1 |
| 2015/0100958 A1* | 4/2015 | Banavalikar | H04L 12/4633 718/1 |
| 2015/0121372 A1* | 4/2015 | Hatta | G06F 9/54 718/1 |
| 2015/0172183 A1 | 6/2015 | DeCusatis et al. | |
| 2015/0195178 A1* | 7/2015 | Bhattacharya | H04L 43/106 718/1 |
| 2015/0281099 A1* | 10/2015 | Banavalikar | H04L 12/4633 370/230 |
| 2015/0319088 A1 | 11/2015 | Wenig | |
| 2015/0326467 A1 | 11/2015 | Fullbright et al. | |
| 2015/0350061 A1* | 12/2015 | Chunduri | H04L 41/0654 370/228 |
| 2015/0355934 A1 | 12/2015 | Yin et al. | |
| 2015/0365324 A1 | 12/2015 | Kumar et al. | |
| 2016/0036695 A1* | 2/2016 | Mirsky | H04L 45/507 370/243 |
| 2016/0094650 A1* | 3/2016 | Garcia de Rio | G06F 9/46 709/226 |
| 2016/0105408 A1 | 4/2016 | Cooper et al. | |
| 2016/0191341 A1 | 6/2016 | Sivasankaran | |
| 2016/0234673 A1* | 8/2016 | Fujinami | H04W 36/0033 |

OTHER PUBLICATIONS

IP.com, Supporting migration of Virtual machines running Multi-tier applications in Computing clouds that span multiple IP address ranges, 2010, IP.com, pp. 1-6.*
"International Search Report & Written Opinion Received for PCT Application No. PCT/US2015/057031", dated Jan. 25, 2016, 11 pages.
Ramakrishnan, et al., "Live Data Center Migration across WANs: A Robust Cooperative Context Aware Approach", In Proceedings of the SIGCOMM workshop on Internet Network Management, Jan. 2007, 6 pages.
Travostino, et al., "Seamless Live Migration of Virtual Machines over the MAN/WAN", In Journal of Future Generation Computer Systems, vol. 22 Issue 8, 2006, 7 pages.
"Press Release: Packet Design to Address SDN/MPLS Conference on Urgency of SDN Analytics", Published on: Oct. 28, 2014, Available at: packetdesign.com/news-and-events/press-release-packet-design-to-address-sdn-mpls-conference-on-urgency-of-sdn-analytics.
Singla, et al., "OpenContrail Architecture Document", Published on: Nov. 19, 2013, Available at: opencontrail.org/opencontrail-architecture-documentation/.
Ando, et al., "Network Virtualization for Large-Scale data centers", In In Fujitsu Scientific & Technical Journal, vol. 49, No. 3, Jul. 2013, pp. 292-299.
Narten, et al., "Problem Statement: Overlays for Network Virtualization", In Proceedings of Internet Engineering Task Force, Oct. 2014, 24 pages.
Fang, et al., "MPLS-Based Hierarchical SDN for Hyper-Scale DC/Cloud", In Proceedings of INTERNET-DRAFT, Oct. 27, 2014, 25 pages.
Liebeherr, Jorg, "Addressing and Routing in Multi-substrate Overlay Networks", Retrieved on : Nov. 3, 2014, Available at: slideserve.com/raoul/addressing-and-routing-in-multi-substrate-overlay-networks.
Aggarwal, et al., "Data Center Mobility based on E-VPN, BGP/MPLS IP VPN, IP Routing and NHRP", In Network Working Group, Jun. 2, 2014, 25 pages.
"Data Center Overlay Technologies", In White Paper, Retrieved on: Nov. 3, 2014, 19 pages.
Wood, et al., "CloudNet: Dynamic Pooling of Cloud Resources by Live WAN Migration of Virtual Machines", In Proceedings of the ACM SIGPLAN/SIGOPS International Conference on Virtual

(56) References Cited

OTHER PUBLICATIONS

Execution Environments, Mar. 9, 2011, 12 pages.
Keller, et al., "Live Migration of an Entire Network (and its Hosts)", In Proceedings of the 11th ACM Workshop on Hot Topics in Networks, Oct. 29, 2012, 14 pages.
Kompella, Kireeti, "New Take on SDN: Does MPLS Make Sense in Cloud Data Centers?", Published on: Dec. 11, 2012, Available at: sdncentral.com/use-cases/does-mpls-make-sense-in-cloud-data-centers/2012/12/.
Jiang, et al., "VIOLIN: Virtual Internetworking on Overlay Infrastructure", In Proceedings of Parallel and Distributed Processing and Applications, Dec. 2014, 10 pages.
Afanasiev, et al., "MPLS in DC and inter-DC networks: the unified forwarding mechanism for network programmability at scale", Published on: Mar. 12, 2014 Available at: slideshare.net/DmitryAfanasiev1/yandex-nag201320131031.
"Second Written Opinion Issued in PCT Application No. PCT/US2015/057031", dated Jun. 21, 2016, 5 pages.
Asghar, et al., "A Virtual Network Solution for Service Mobility", In Proceedings of 4th Joint IFIP Wireless and Mobile Networking Conference, Oct. 26, 2011, 6 Pages.
"Cisco Open Network Environment: Network Programmability and Virtual Network Overlays", Retrieved from «//web.archive.org/web/20150327030930://www.cisco.com/c/en/us/products/collateral/ios-nx-os-software/white_paper_c11-707978.html», Retrieved Date: Nov. 5, 2014, 6 Pages.
"Configuring Network Virtualization Segments", Retrieved from «://support.f5.com/kb/en-us/products/big-ip_ltm/manuals/product/bigip-tmos-tunnels-ipsec-11-6-0/1.print.html», Retrieved Date: Nov. 5, 2014, 9 Pages.
"Networking Innovations for HP Proliant Gen9 Servers", In Technical White Paper, Sep. 2014, 9 Pages.
"Final Office Action Issued in U.S. Appl. No. 14/555,865", dated Sep. 29, 2016, 22 Pages.
"Non Final Office Action Issued in U.S. Appl. No. 14/555,865", dated Mar. 7, 2016, 20 Pages.
Crisan, et al., "Got Loss? Get zOVN!", In Proceedings of the Conference on SIGCOMM, ACM, Aug. 12, 2013, pp. 423-434.
Kempf, et al., "Zeppelin—A Third Generation Data Center Network Virtualization Technology Based on SDN and MPLS", In IEEE 2nd International Conference on Cloud Networking (CloudNet), Nov. 11, 2013, 9 Pages.
Miniman, Stuart, "Networking in Hyperscale Environments", Retrieved from «p://wikibon.org/wiki/v/Networking_in_Hyperscale_Environments», May, 2014, 5 Pages.
"International search Report and Written Opinion Issued in PCT Application No. PCT/US2015/057030", dated Feb. 17, 2016, 13 Pages.
"International Search Report and Written Opinion Issued in PCT Application No. PCT/US2015/057032", dated Feb. 17, 2016, 13 Pages.
"Second Written Opinion Issued in PCT Application No. PCT/US2015/057032", dated Sep. 16, 2016, 10 Pages.
"International Preliminary Report on Patentability Issued in PCT Application No. PCT/US2015/057032", dated Dec. 13, 2016, 11 Pages.
"International Preliminary Report on Patentability Issued in PCT Application No. PCT/US2015/057030", dated Dec. 22, 2016, 8 Pages.
"International Preliminary Report on Patentability Issued in PCT Application No. PCT/US2015/057031", dated Jan. 23, 2017, 7 Pages.
"Non Final Office Action Issued in U.S. Appl. No. 14/555,865", dated Mar. 9, 2017, 16 Pages.
"Final Office Action Issued in U.S. Appl. No. 14/555,881", dated Aug. 15, 2017, 20 Pages.
"Non Final Office Action Issued in U.S. Appl. No. 14/555,881", dated Feb. 10, 2017, 23 Pages.
"Notice of Allowance Issued in U.S. Appl. No. 14/555,881", dated Nov. 20, 2017, 23 Pages.
"Notice of Allowance Issued in U.S. App. No. 14/555,865", dated Nov. 6, 2017, 7 Pages.

* cited by examiner

US 10,038,629 B2

VIRTUAL MACHINE MIGRATION USING LABEL BASED UNDERLAY NETWORK FORWARDING

CROSS-REFERENCE TO RELATED APPLICATION(S)

This application is a non-provisional application of U.S. provisional application No. 62/068,710, filed Oct. 26, 2014, the disclosure of which is incorporated herein in its entirety. This application also incorporates by reference subject matter from U.S. patent application Ser. No. 14/484,169, filed Sep. 11, 2014.

BACKGROUND

Computer networks can have a large number of physical servers interconnected with one another in an underlay network by routers, switches, bridges, or other network devices via wired or wireless network links. Each physical server can host multiple virtualized servers, virtual network functions, or other suitable virtual entities interconnected with one another in one or more virtual overlay networks supported by the underlay network. The virtualized entities may be relocated or migrated from one or more originating servers to one or more target servers in the underlay network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Several embodiments of the disclosed technology are directed to utilizing a label based underlay network to support migration of virtual machine and/or virtualized network functions in an overlay network implemented over the underlay network. Various forwarding and/or tunneling properties of the label-based underlay network can be used to achieve such migration. In particular embodiments, the underlay network can be hierarchically partitioned into multiple domains to support the migration of virtual machine and/or virtualized network functions in the overlay network. In further embodiments, the underlay network can include other suitable configurations.

DETAILED DESCRIPTION

Figure 1:
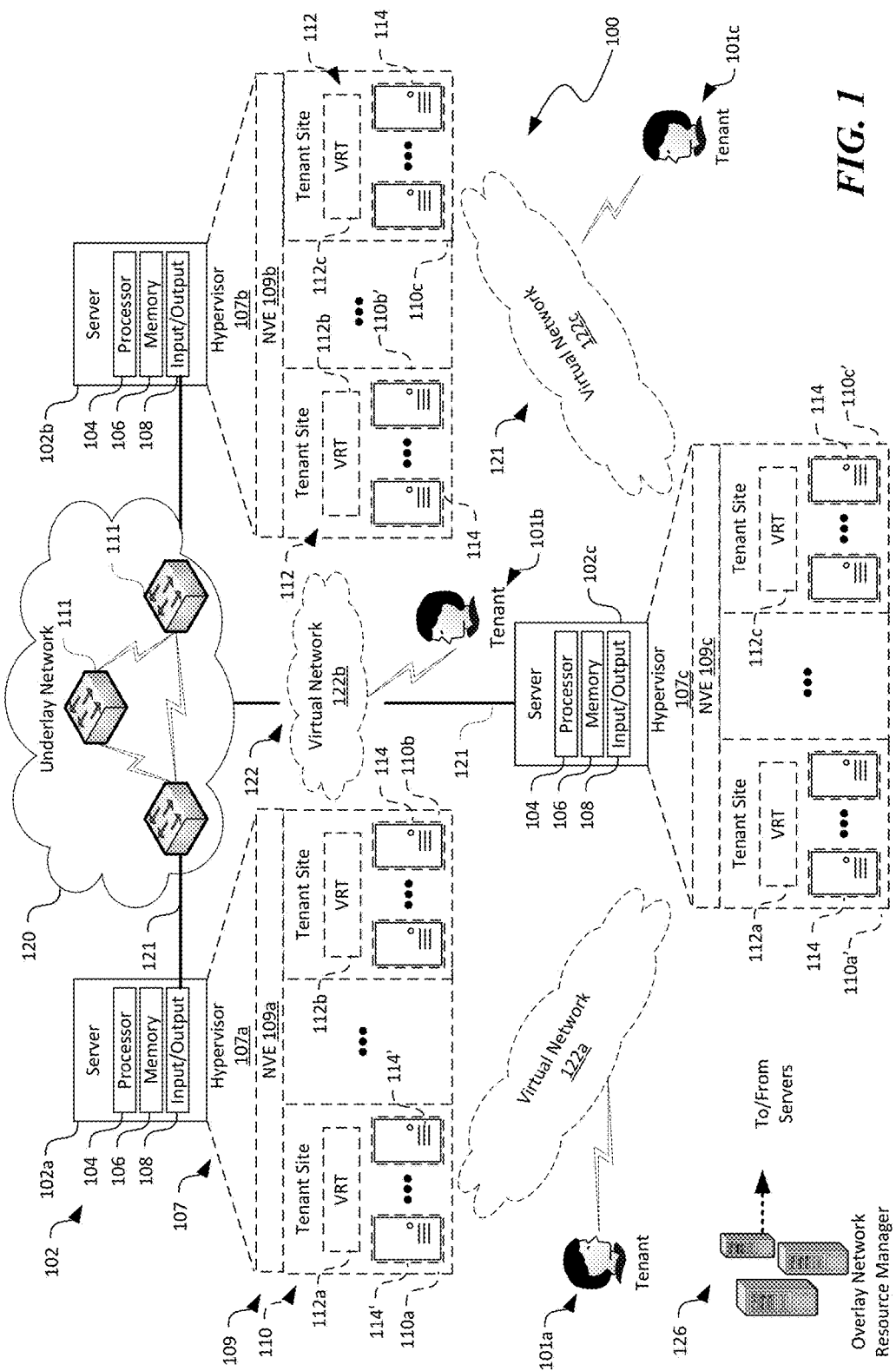
FIG. 1 is a schematic diagram illustrating a computer network in accordance with embodiments of the disclosed technology.

Certain embodiments of systems, devices, components, modules, routines, and processes for migration of virtual machine, virtual network functions, or other virtual entities in a computer network are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "computer network" generally refers to an interconnection network having a plurality of network nodes that connect a plurality of end points to one another and to other networks (e.g., the Internet). The term "network node" generally refers to a physical and/or software emulated (or virtual) network device. Example network nodes include routers, switches, hubs, bridges, load balancers, security gateways, firewalls, network name translators, or name servers.

A computer network supporting virtual or physical network devices, network nodes, and network end points can be conceptually divided into an overlay network implemented over an underlay network. An "overlay network" generally refers to an abstracted network implemented over and operating on top of an underlay network, which can include multiple physical network nodes interconnected with one another and with physical end points. For example, an overlay network can include one or more virtual networks implemented over an underlay network. The virtual networks interconnect multiple physical servers or virtualized servers hosted on different physical servers interconnected by physical network nodes in the underlay network. Virtual network nodes in the overlay network can be connected to one another by virtual or logical links individually corresponding to one or more paths along one or more physical network nodes in the underlay network.

A "virtual network" generally refers to an abstraction of a portion of the underlay network in the overlay network. A virtual network can include one or more virtual end points referred to as "tenant sites" individually used by a user or "tenant" to access the virtual network and associated computing, storing, or other suitable resources. A tenant site can host one or more tenant end points ("TEPs"), for example, virtual machines. A tenant site can also include a virtual routing table ("VRT") containing reachability information for routing messages among TEPs in a particular virtual network. For example, reachability information can include a mapping of a virtual end point to an address of a network node in the underlay network at which the virtual end point currently resides.

A "network virtualization edge" or "NVE" generally refers to a network entity at an edge of the underlay network to connect one or more tenant sites to their respective virtual networks. In one example, a network virtualization edge in a virtual private network ("VPN") based on a multi-protocol label switching network ("MPLS") is a VPN provider edge. A "virtualized network function" or "VNF" generally refers to a network function implemented in an overlay network and residing in a server or a network node. Example VNFs include a software load balancer, a virtual firewall, and a virtual network name translator.

The term "end point" generally refers to a physical or software emulated computing device. Example end points include network servers, network storage devices, personal computers, mobile computing devices (e.g., smartphones), network functions virtualization, or virtual machines. Each end point can be associated with an end point identifier that can have a distinct value in an overlay and/or underlay network. Examples of end point identifiers (or network node identifiers) can include at least a portion of a label used in a MPLS network, a stack of labels used in a MPLS network, one or more addresses according to the Internet Protocol ("IP"), one or more virtual IP addresses, one or more tags in a virtual local area network, one or more media access control addresses, one or more Lambda identifiers, one or more connection paths, one or more physical interface identifiers, or one or more packet headers or envelopes.

The term "domain" generally refers to a physical or logical partition of an underlay network. A domain can include a select number of network nodes interconnected with one another and/or with a number of end points in the underlay network. A domain can also be connected to one or more higher-level domains that include a number of additional network nodes that connect the particular domain to other domains at the same or different levels in a hierarchy of domains. In certain embodiments, a software defined network ("SDN") can be used to dividing the underlay network into multiple domains. In other embodiments, one or more of the domains of the underlay network can be at least partially a distributed computer network that use distributed routing and/or forwarding protocols.

FIG. 1 is a schematic diagram illustrating a computer network 100 in accordance with embodiments of the disclosed technology. As shown in FIG. 1, the computer network 100 can include a underlay network 120 and an overlay network 121 implemented over and operating on top of the underlay network 120. In the illustrated embodiment, the overlay network 121 is shown to include first, second, and third virtual networks 112a, 112b, and 112c for illustration purposes. In other embodiments, the overlay network 121 can include any other suitable number of virtual networks and/or virtual network functions (not shown).

As shown in FIG. 1, the underlay network 120 can include a plurality of network nodes 111 (three are shown for illustration purposes) interconnecting multiple servers 102 (shown as first, second, and third servers 102a-102c, respectively). The servers 102 can individually include a processor 104 coupled to a memory 106 and an input/output component 108. The processor 102 can include a microprocessor, a field-programmable gate array, and/or other suitable logic devices. The memory 104 can include non-transitory volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 102 (e.g., instructions for performing the methods discussed below with reference to FIG. 4). The input/output component 108 can include a display, a touch screen, a keyboard, a mouse, a printer, and/or other suitable types of input/output devices configured to accept input from and provide output to an operator and/or an automated software controller (not shown). Even though the underlay network 120 is shown in FIG. 1 as having a planar network structure, in certain embodiments, the underlay network 120 can be organized into multiple hierarchical domains, as described in more detail below with reference to FIG. 2. In further embodiments, the underlay network 120 can be organized in other suitable manners.

The servers 102 can individually contain instructions in the memory 106 that when executed by the processors 102, cause the individual processors 102 to provide a hypervisor 107 and an NVE 109. The hypervisors 107 can individually be configured to generate, monitor, terminate, and/or otherwise manage one or more virtual machines 114 organized into tenant sites 110. For example, as shown in FIG. 1, the first server 102a can provide a first hypervisor 107a that manages first and second tenant sites 110a and 110b, respectively. The second server 102b can provide a second hypervisor 107b that manages second and third tenant sites 110b' and 110c, respectively. The third server 102c can provide a hypervisor 107c that manages first and third tenant sites 110a' and 110c', respectively. The tenant sites 110 can each include one or more virtual machines 114 and/or virtual network functions (not shown). The hypervisors 107 are individually shown in FIG. 1 as a software component. However, in other embodiments, the hypervisors 107 can each be a firmware and/or hardware component. The NVE 109 can be configured to connect one or more tenant sites 110 to their respective virtual networks 122. Even though the NVE 109 is shown as a separate software component in FIG. 1, in further embodiments, the NVE 109 can be integral to or forms a portion of the corresponding hypervisor 107.

As shown in FIG. 1, the different servers 102 can individually host a tenant site 110 that includes multiple virtual machines 114 for a particular tenant 101 (identified as first, second, and third tenants 101a, 101b, and 101c, respectively). For example, the first server 102a and the third server 102c can both host the tenant site 110a and 110a' for a first tenant 101a. The first server 102a and the second server 102b can both host the tenant site 110b and 110b' for a second tenant 101b. The second server 102b and the third server 102c can both host the tenant site 110c and 110c' for a third tenant 101c. Each virtual machine 114 can be executing a corresponding operating system, middleware, and/or applications.

The overlay network 121 can include one or more virtual networks 122 that interconnect the tenant sites 110 of a particular tenant 101 across multiple servers 102. For example, a first virtual network 122a interconnects the first tenant sites 110a and 110a' at the first server 102a and at the third server 102c. A second virtual network 122b interconnects the second tenant sites 110b and 110b' at the first server 102a and at the second server 102b. A third virtual network 122c interconnects the third tenant sites 110c and 110c' at the second server 102b and at the third server 102c. Even though one virtual network 122 is shown as corresponding to one tenant 101, in other embodiments, multiple virtual networks 122 may be assigned to correspond to a single tenant 101.

The virtual machines 114 on a particular virtual network 122 can communicate with one another via the virtual network 122 even though the virtual machines 114 are hosted on different servers 102. For example, the virtual machines 114 of the first tenant site 110a on the first server 102a can communicate with other virtual machines 114 of the first tenant site 110a' on the third server 102c based at least in part on the first VRT 112a for the first virtual network 122a. In another example, the virtual machines 114 of the second tenant site 110b on the first server 102a can communicate with other virtual machines 114 of the second tenant site 110b' on the second server 102b based at least in part on the second VRT 112b for the second virtual network 122b. Communications of each of the virtual networks 122 though can be isolated from other virtual networks 122. In certain embodiments, communications can be allowed to cross from one virtual network 122 to another through a security gateway or otherwise in a controlled fashion. The VRTs 112 can individually contain tenant addresses each include a virtual network identifier corresponding to a virtualized end point or network node in a particular virtual network 122. Thus, different virtual networks 122 may use one or more same virtual network identifiers and/or identifier values. As a result, a tenant can use his/her own address space in each virtual network, which may overlap with an address space of other tenants and/or with an address space used within a data center by the data center provider. Example virtual network identifiers can include IP addresses, MAC addresses, and/or other suitable addresses. In other embodiments, communications of the different virtual networks 122 may be isolated in other suitable manners.

Each of the virtual networks 122 can also allow the individual tenants 101 to access the corresponding tenant sites 110 via the underlay network 120 and/or other suitable networks (e.g., the Internet). For example, the first tenant 101a can access one of the virtual machines 114 at either the first tenant site 110a or 110a' hosted by the first server 102a or third server 102c, respectively. The second tenant 101b can access one of the virtual machines 114 at either the second tenant site 110b or 110b' hosted by the first server 102a or second server 102b, respectively. The third tenant 101c can access one of the virtual machines 114 at either the third tenant site 110c or 110c' hosted by the second server 102b or third server 102c, respectively.

The computer network 100 can also include an overlay network resource manager 126 operatively coupled to the servers 102. The overlay network resource manager 126 can be configured to allocate physical resources of the computer network 100 to a particular virtual machine 114, a tenant site 110, a virtual network 122, a combination of the foregoing, or other suitable entities. For example, in one embodiment, the overlay network resource manager 126 can allocate resources of the first server 102a to one or more virtual machines 114 associated with the first tenant site 110a. In another example, the overlay network resource manager 126 can allocate resources of the second server 102a to the same one or more virtual machines 114.

The overlay network resource manager 126 can also be configured to communicate reachability information with the servers 102. Example reachability information can include, for example, a underlay location identifier or underlay network address that identifies a physical server (e.g., the first server 102a) and/or a network device 111 of the underlay network 120 on which the virtual machine 114' is hosted. The underlay location identifier or underlay network address can include at least one of (or a combination of) a MPLS Label or a portion of a MPLS label, a stack of ordered MPLS labels, one or more IPv4 addresses, one or more IPv6 addresses, one or more Virtual IP addresses, one or more VLAN tags, one or more MAC addresses, one or more Lambda identifiers, one or more connection paths leading to the end point, one or more physical interface identifiers, one or more sets of bits, one or more packet headers or envelopes, or other suitable location identifiers. An example underlay network address is described in more detail below with reference to FIG. 5.

The reachability information can also include a virtual network identifier of the virtual machine 114' on the first virtual network 122a, routes through the underlay network 120 to reach the virtual machine 114', and/or other suitable information. Based on the reachability information, the servers 102 can populate and/or update entries in corresponding VRTs 112 in a timely fashion, and thus reducing the risk of communication interruptions and/or system failure.

During operation, virtual machines 114 at a particular tenant site 110 may need to be relocated or migrated to be hosted by a different server 102. For example, one or more virtual machines 114 at the first tenant site 110a may need to be relocated to the third server 102c due to system maintenance of the first server 102a or other suitable reasons. Such migration can be implemented via one or more network paths in the label based underlay network 120. During the relocation, the relocated virtual machines 114 can maintain their respective virtual network identifiers (e.g., IP addresses or MAC addresses) in the first virtual network 122a. However, physical locations of these virtual machines 114, as identified by, for example, by underlay network addresses need to be updated from the first server 102a to the third server 102c. Several embodiments of example operations of the computer network 100 are described in more detail below with reference to FIG. 3.

Figure 2:
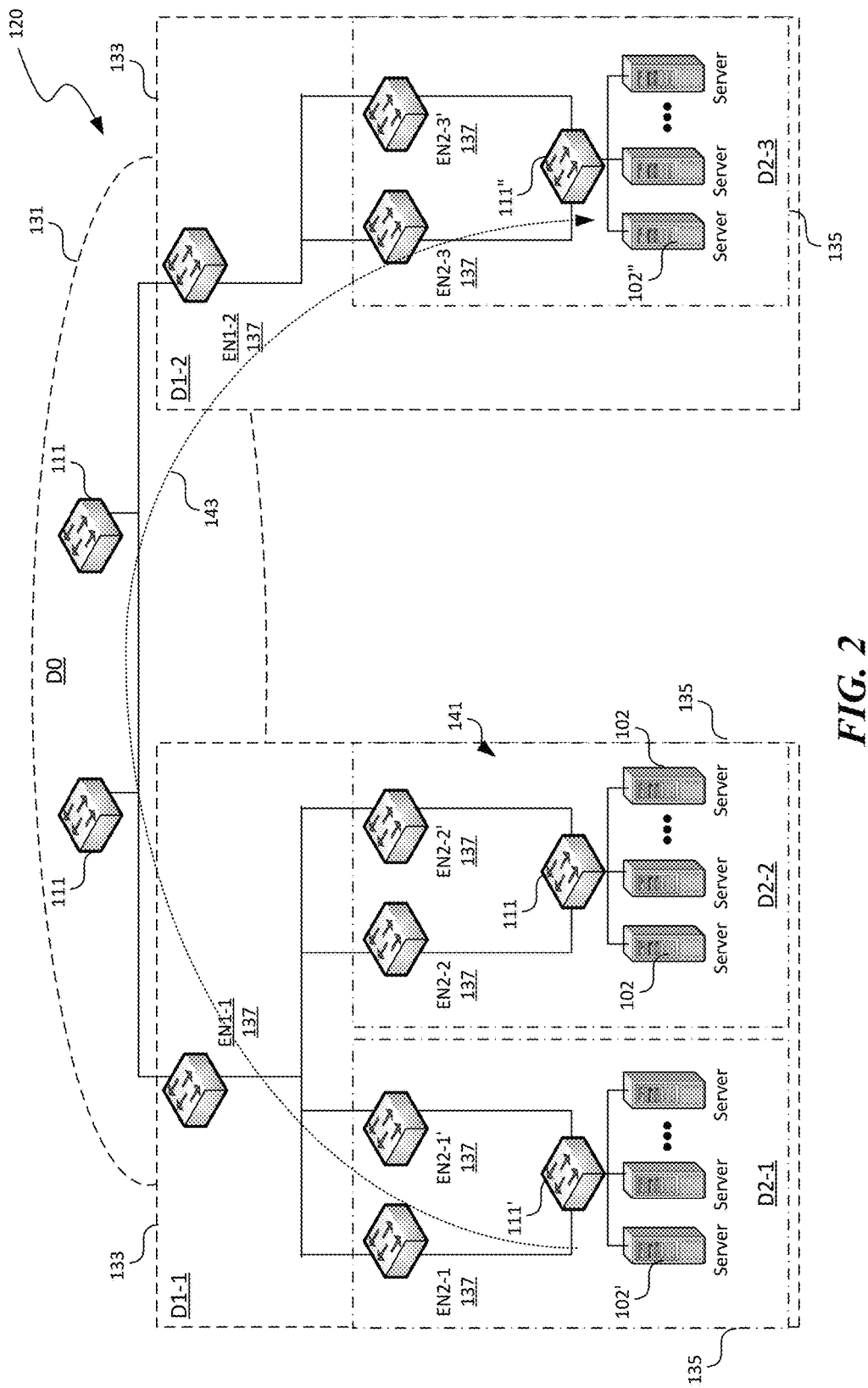
FIG. 2 is a schematic diagram illustrating an example hierarchical underlay network suitable for the computer network of FIG. 1 in accordance with embodiments of the disclosed technology.

FIG. 2 is a schematic diagram illustrating an example hierarchical underlay network 120 suitable for the computer network 100 of FIG. 1 in accordance with embodiments of the disclosed technology. Even though a particular arrangement of the underlay network 120 is shown in FIG. 2, various techniques of migrating virtual entities in the computer network 100 of FIG. 1 may be applied to other underlay networks having different arrangements of network nodes and/or end points than that shown in FIG. 2.

As shown in FIG. 2, the underlay network 120 can include a core domain 131 having one or more network nodes 111. The underlay network 120 can also include one or more level-one domains 133. Two level-one domains 133 are shown in FIG. 2 for illustration purposes and are individually identified as domains D1-1 and D1-2. In the illustrated embodiment, the level-one domain D1-1 includes two level-two domains 135 (individually identified as D2-1 and D2-2). The level-one domain D1-2 includes one level-two domain D2-3. In other embodiments, the level-one domains 104 can include other suitable number of domains and/or end points.

The level-two domains 106 can individually include one or more end points 141 such as servers 102, one or more edge nodes 137, and one or more network nodes 111 connecting the end points 108 to the edge nodes 137. In one embodiment, the network nodes 111 can individually include a top-of-rack ("TOR") router or switch. In other embodiments, the network node 111 can include a bridge, a gateway, or other suitable communications device. In the illustrated embodiment, each of the level-two domains 135 includes two edge nodes 137 (e.g., edge nodes EN2-1 and EN2-1') forming an edge node group. In certain embodiments, the edge nodes 137 in an edge node group can be accessed randomly, for example, for non-traffic engineering type packets. In other embodiments, one of the edge nodes 137 in an edge node group can be particularly identified and specified to handle, for example, traffic engineering type packets. In further embodiments, the edge nodes 137 can be accessed in other suitable manners based on any other suitable criteria.

The hierarchical division shown in FIG. 2 can be applied to one or multiple data centers in various manners. For example, in certain embodiments, the hierarchical division shown in FIG. 2 can be applied to one data center with the core domain 131 including one or more T3 broadband switches of the data center. The level-one domains 133 can include T2 switches which are connected to level-two domains 135 having T1 and/or TOR switches. In other embodiments, the level-one domains 133 can include both T2 and T1 switches while the level-two domains 135 include the TOR switches. In another example, the hierarchical division shown in FIG. 2 can also be applied to multiple data centers. For instance, the core domain 131 can include a core network interconnecting multiple data centers and the T3 broadband switches. Within each data center, the level-one domains 133 can include the T2 switches while the level-two domains can include the T1 and/or TOR switches. In further examples, the division of the underlay network 120 can include additional and/or different domain levels.

In any of the foregoing embodiments, the edge nodes 137 can be configured to route communications to/from a higher level or a lower level domain along one or more network paths or tunnels 143. For example, a message from the server 102' in the level-two domain D2-1 to the server 102" in the level-two domain D2-3 can be routed via a tunnel 143 starting from the network node 111' to the edge nodes EN2-1 or EN2-1' and then to the level-one domain D1-1. The edge node EN1-1 of the level-one domain D1-1 can forward the message to the level-one domain D1-2 via one or more of the network nodes 111 of the core domain 131. The level-one domain D1-2 can then forward the message via the edge node EN1-2 to the edge nodes EN2-3 or EN2-3' of the level-two domain D2-3, which in turn forward the message to the server 102" via the network node 111'. In certain embodiments, the tunnel 143 may be pre-established, for example, with a network route pre-computed based on at least one of a source or destination address in the underlay network 120 according to, e.g., MPLS protocol. In other embodiments, the tunnel 143 may be computed, established, and/or otherwise formed on an ad hoc basis or in other suitable manners. In any of the foregoing embodiments, a network node 111 and/or an end point 141 may be identified by an underlay network address. Examples of underlay network address are described with reference to FIG. 5.

Figure 3:
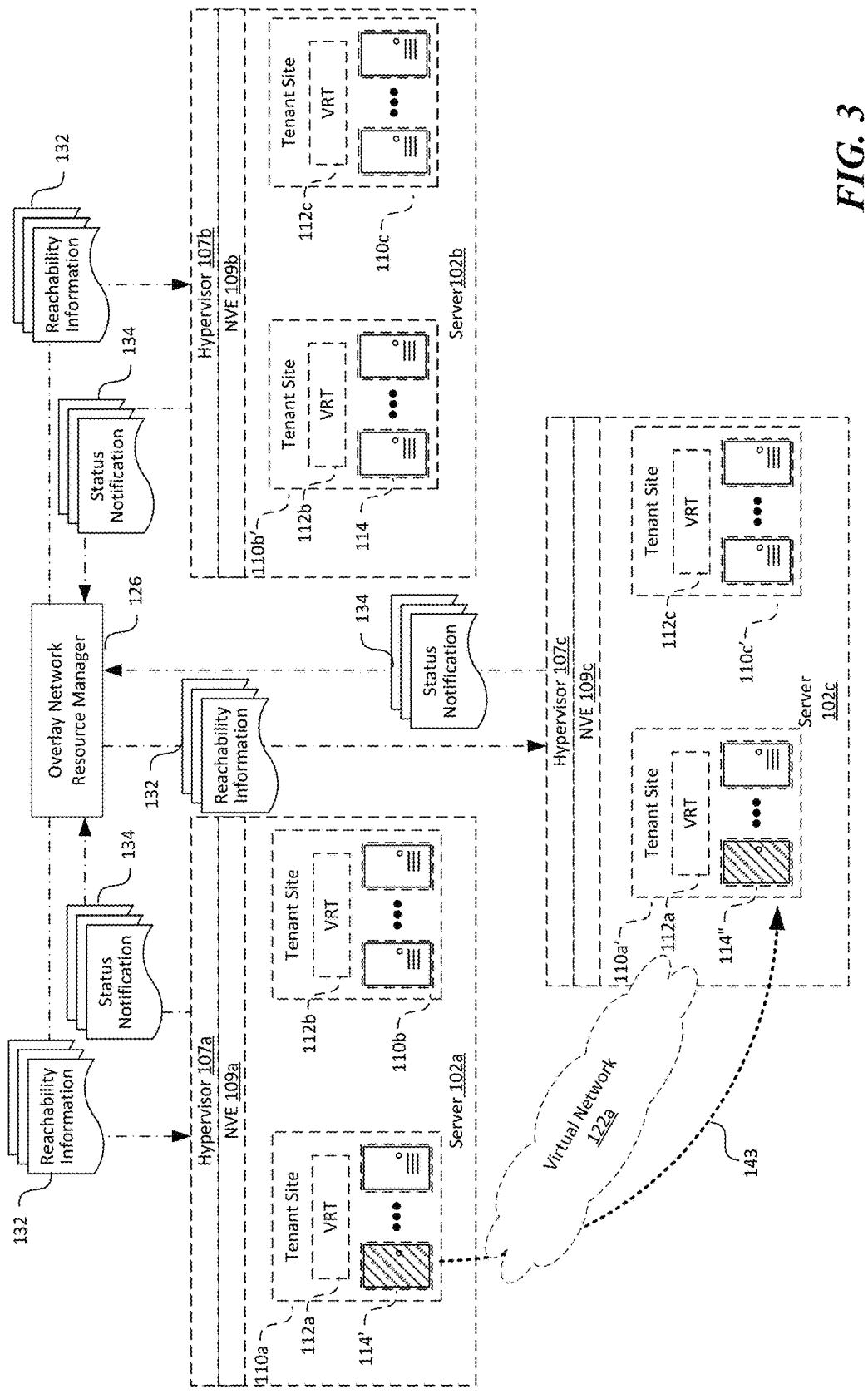
FIG. 3 is a schematic diagram illustrating example operations of the computer network in accordance with embodiments of the disclosed technology. Certain portions of the computer network in FIG. 1 is omitted for clarity.

FIG. 3 is a schematic diagram illustrating example operations of the computer network 100 in accordance with embodiments of the disclosed technology. Certain components of the computer network 100 are omitted from FIG. 3 for clarity. As shown in FIG. 3, the overlay network resource manager 126 can be configured to communicate to the servers 102 information regarding any resource allocations, e.g., allocation of resources to the virtual machines 114, relocation of any virtual machines 114 and/or virtual network functions, or other suitable resource allocation operations. Based on such information, the individual servers 102, the hypervisor 107, the NVE 109, and/or other suitable components may establish a network path or tunnel through which a virtual machine 114 may be relocated.

To illustrate with an example, the overlay network resource manager 126 can be configured to inform the first server 102a to instantiate a new virtual machine 114' and attach the instantiated virtual machine 114' to the first virtual network 122a. In one embodiment, the overlay network resource manager 126 informs the first server 102a by transmitting reachability information 132. In other embodiments, the overlay network resource manager 126 can also inform the first server 102a via an application programming interface and/or other suitable interfaces. In response to the reachability information 132, the first server 102a (with the first hypervisor 107a in FIG. 1) can instantiate the requested virtual machine 114' and attach the virtual machine 114' to the first virtual network 122a. The first server 102a can then transmit to the overlay network resource manager 126 a status notification 134 to report that the instantiation of the virtual machine 114' is completed and the virtual machine 114' is attached to the first virtual network 122a.

The overlay network resource manager 126 can then communicate suitable reachability information regarding the resource allocation to other servers 102. For instance, in the example above, the instantiated virtual machine 114' is attached to the first virtual network 122a, the overlay network resource manager 126 can transmit reachability information 132 regarding the instantiated virtual machine 114' to the first and third servers 102a and 102c.

Based on the transmitted reachability information, the first and third servers 102a and 102c can then update the first and third VRT 112a and 112c to have a new or updated entry for the instantiated virtual machine 114'. For instance, an entry in the first VRT 112a can include a tenant address (e.g., a virtual network address) for the instantiated virtual machine 114' on the first virtual network 122a because the virtual machine 114' is local. A corresponding entry in the third VRT 112c can include the tenant address and an associated underlay location identifier that identifies, for example, the first server 102a, for the virtual machines 114'.

The overlay network resource manager 126 can also facilitate relocation of one or more virtual machines 114 from one server 102 to another via the label based underlay network. For example, the virtual machine 114' hosted on the first server 102a (referred to below as the originating virtual machine 114') can be decided to be relocated from the first server 102a to the third server 102c. Reasons for such relocation can include load balancing, system upgrade and/or maintenance, user request, server failure, and/or other suitable reasons.

As an initial operation, the overlay network resource manager 126 prepares a target virtual machine 114" at the third server 102c by transmitting reachability information 132 to the third server 102c. Based on the reachability information, the third server 102c configures the VRT 112c in the NVE 109c of the first virtual network 122a. The third server 102c then communicates with the third hypervisor 107c (FIG. 1) to setup and start the targeting virtual machine 114". If the third NVE 109c does not include any end points for the first virtual network 122a, a new tenant site 110 and VRT 112 for the targeting virtual machine 114" can be created. The VRT 112 can then be populated with information (e.g., addresses and/or network routes) based on information received by the third server 102c from the overlay network resource manager 126. If the third NVE 109c already includes at least one end point of the first virtual network 122a, the targeting virtual machine 114" in the first tenant site 110a' can be attached to the first virtual network 122a.

The third server 102c can then transmit a status notification 134 to the overlay network resource manager 126 and informs it that the preparation for the targeting virtual machine 114" is completed. In response, the overlay network resource manager 126 informs the first server 102c to start migrating the originating virtual machine 114' to the targeting virtual machine 114" hosted on the third server 102c. In certain embodiments, relocation of the virtual machine 114' can include transmitting configuration, data, and/or other suitable information from the originating virtual machine 114' to the targeting virtual machine 114".

The relocation of the originating virtual machine 114' can be according to three scenarios referred to herein as hot, warm, or cold relocation. In a hot relocation, the originating virtual machine 114' is relocated from one server 102 to another while continuing to run and without being shut down and restarted at the new location. In a warm relocation, the originating virtual machine 114' is suspended with associated configuration saved in memory or a disk file, and later the virtual machine 114 is resumed once relocation is completed. In a cold relocation, the originating virtual machine 114' is shut down with associated configuration moved to the hypervisor 107 in the new host, and then the virtual machine 114' is restarted in the new location.

During such relocation, the originating virtual machine 114' can maintain its network state and connectivity information, for example, its tenant address (e.g., IP address in the first virtual network 122a) and/or its MAC address to prevent or at least reduce the risk of existing TCP sessions being interrupted and needing restart. However, the IP address of the new host (i.e., the third server 102c) in the underlay network 120 (FIG. 1) necessarily changes as the originating virtual machine 114' is relocated to the third server 102c.

In order to maintain the IP address of the originating virtual machine 114' in the first virtual network 122a, the address of the virtual machine 114' in the overlay network 121 is decoupled from the address of the same virtual machine 114 in the underlay network 120. For example, in certain embodiments, the originating virtual machine 114' can be identified by an end point identifier that includes a tenant virtual network identifier ("TVNI"), a tenant address ("TN"), and a underlay network address ("UNA") as TVNI/TA→UNA. The TVNI identifies a virtual network (e.g., the first virtual network 122a) to which the virtual machine 114' is attached to. The tenant address can include, for example, an IP address that identifies the virtual machine 114' on the first virtual network 122a. The underlay network address identifies the network node in the underlay network 120 (FIG. 1) on which the virtual machine 114' is hosted. In other embodiments, the virtual machine 114' can be identified in other suitable manners.

In response to the relocation, a portion of the end point identifier of the virtual machine 114' can be maintained and another portion can be adjusted. For example, in one embodiment, the TVNI/TA of the virtual machine 114' can be maintained such that the virtual machine 114' has the same address on the first virtual network 122a. However, the UNA can be adjusted to correspond to the third server 102c, which hosts the targeting virtual machine 114". Thus, the end point identifier of the virtual machine 114' can be adjusted from TVNI/TA→UNA to TVNI/TA→UNA', where UNA and UNA' correspond to addresses of the first and third servers 102a and 102c, respectively.

Continuing with the example above, in response to the reachability information 132 from the overlay network resource manager 126, the first server 102a can configure an originating point of a transition tunnel 143 through the label based underlay network 120 (FIG. 2) to a targeting point for reducing or even avoiding packet loss during relocation. A targeting point (e.g., the third server 102c) can configure the targeting end point of the transition tunnel 143. The transition tunnel can include one or more network nodes 111 (FIG. 1) of the underlay network 120 through which the configuration, data, and/or other suitable information of the virtual machine 114' can be transmitted from an originating host (e.g., the first server 102a) to a targeting host (e.g., the third server 102c). In other embodiments, the transition tunnel can be established by other suitable entities.

In one embodiment, the transition tunnel 143 can be pre-established. For example, a pre-established tunnel can include a network path from the originating host to the targeting host established in the forwarding tables in the network nodes in the underlay network 120. If the underlay network 120 is hierarchically divided such as that shown in FIG. 2, the transition tunnel from a server 102 to any other servers 102 can be pre-established in the underlay network 120 following, e.g., MPLS protocol. In such embodiments, the underlay network address identifier may be utilized to identify a desired network path in the underlay network 120. The identified network path may be different than the shortest network path computed by a corresponding routing protocol. In another embodiment, the underlay network address can be used to identify network paths that can be used. In other embodiments, a combination of at least some of the tenant virtual network identifier, a tenant address, or a underlay network address can be utilized to identify the desired network path in the underlay network 120.

The overlay network resource manager 126 can determine the underlay network address and/or a network path to be used for the transition tunnel 143 and communicates the underlay network address and/or the network path to the first server 102c associated to the originating host. In certain embodiments, the overlay network resource manager 126 can identify the network path by transmitting to the originating host certain reachability information of the target host (e.g., an underlay network address thereof). In other embodiments, the network path may be identified in other suitable manners.

Once the underlay network address and/or the network path is determined, tunneling operation at the originating host (e.g., the first server 102a) can begin. In certain embodiments, the first server 102a can encapsulate packets associated with the relocated virtual machine 114' (or VNF) using the underlay network address or a label and forward the encapsulated packets through the underlay network 120 to the targeting virtual machine 114". As such packet loss during virtual machine relocation can be reduced or even avoided.

Eventually, the transition tunnel may not be needed anymore because the VRTs 112 of the impacted virtual network 122 (e.g., the first virtual network 122a) are all updated independently with the new end point identifier values. Thus, messages to the relocated virtual machine 114' can be transmitted directly to the target virtual machine 114". The transition tunnel can include an entry in the VRT 112 of the virtual network 122 at the originating NVE 109. Thus, the transition tunnel can be eliminated after a select period of time, for example by using a timer to eliminate the entry in the VRT 112.

Figure 4:
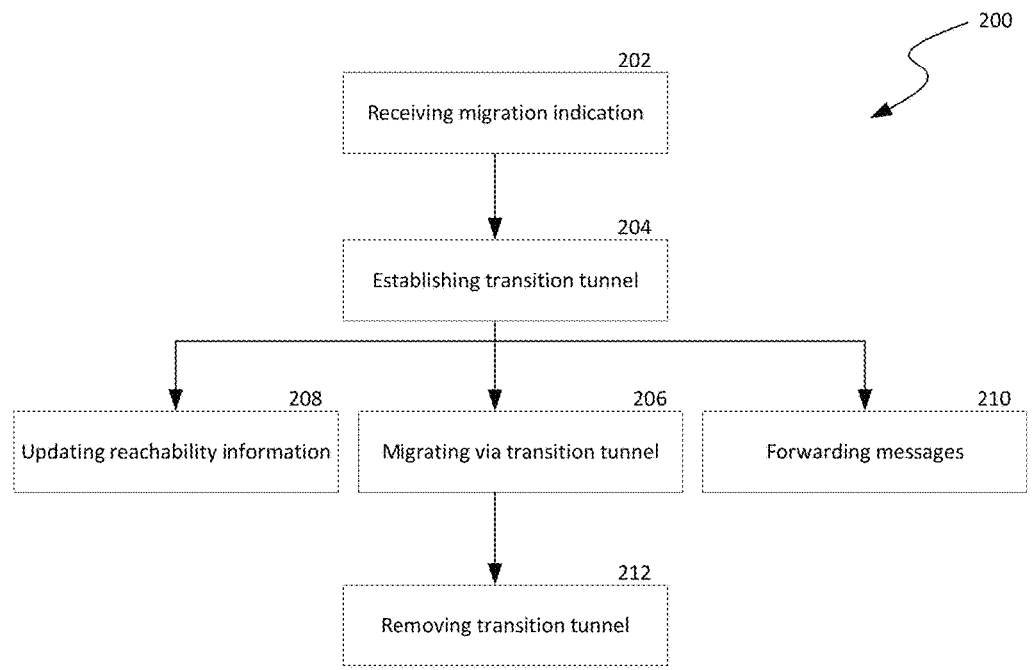
FIG. 4 is a flowchart illustrating a process of migrating virtual entities in accordance with embodiments of the disclosed technology.

FIG. 4 is a flowchart illustrating a process 200 of migrating a virtual machine via a label based underlay network in accordance with embodiments of the disclosed technology. An example of a label based underlay network is an underlay network using MPLS labels (or an MPLS label stack) for forwarding packets from a source to a destination in the underlay network. As shown in FIG. 4, the process 200 can include receiving, at an originating host, a migration indication, for example, from the overlay network resource manager 126 of FIG. 1, at stage 202. In certain embodiments, the received migration indication can include an underlay network address of a target host for virtual machine to be migrated. In other embodiments, the received migration indication can also include one or more identified network paths in the underlay network. In further embodiments, the received migration indication can include other suitable information.

The process 200 can then include establishing a transition tunnel in the underlay network 120 (FIG. 1) at stage 204. In one embodiment, the transition tunnel may be pre-established, for example, based on the underlay network address of the target host. For example, the underlay network address of the target host may correspond to a pre-computed network path from the originating host to the target host according to, for instance, the MPLS protocol. In other embodiments, the transition tunnel may be computed subsequent to receiving the migration indication based at least in part on the underlay network addresses of the originating and target hosts. In further embodiments, the transition tunnel may be established in other suitable manners.

The process 200 can then include migrating the virtual machine via the established transition tunnel at stage 206. In one embodiment, migrating the virtual machine can include a hot, warm, or cold migration of the virtual machine. In other embodiments, the migration can include other suitable types. The process 200 can also include updating reachability information of the relocated virtual machine to other virtual machines at stage 208. In certain embodiments, the updated reachability information is transmitted to other virtual machines, by the overlay network resource manager 126 of FIG. 1, the server 102 of FIG. 1, a combination of the foregoing components, or other suitable components of the computer network 100 (FIG. 1).

The process 200 can also include forwarding communications destined to the relocated virtual machine to the target host via the established transition tunnel for at least a period of time at stage 210. The period of time may be sufficiently long enough to allow updating the other virtual machines with the new underlay network address of the migrated virtual machine. After the period of time is expired, the process 200 can include terminating the forwarding and removing the transition tunnel at stage 212. In the illustrated embodiment, the stages 206, 208, and 210 are shown as being parallel to one another. In other embodiments, the foregoing operations may be performed in series or in other suitable manners.

Figure 5:
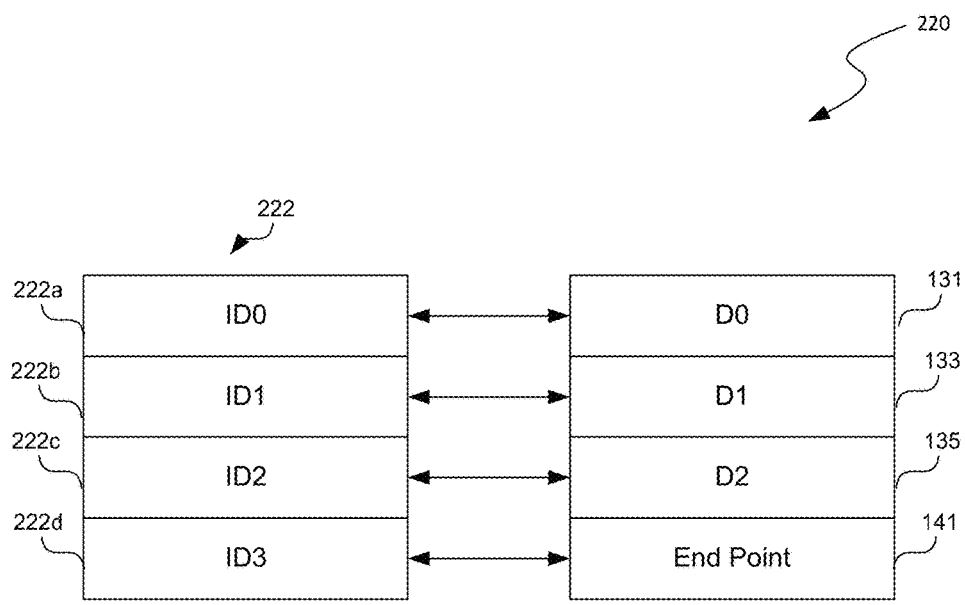
FIG. 5 is a block diagram illustrating an example underlay network address having sections arranged in a stack in accordance with embodiments of the present technology.

FIG. 5 is a block diagram illustrating an example underlay network identifier having sections arranged in a stack in accordance with embodiments of the present technology. As shown in FIG. 5, the underlay network address 220 includes four sections 222a-222d in the underlay network address 220, individually identified as sections ID0, ID1, ID2, and ID3, and arranged according to a hierarchy of an underlay network such as that shown in FIG. 2. For example, in the illustrated embodiment, each of the sections ID0, ID1, ID2, and ID3 may be configured to contain a value that corresponds to the core domain D0 (FIG. 2), level-one domain D1 (FIG. 2), level-two domain D2 (FIG. 2), and the end point 141, respectively, in the underlay network 120 shown in FIG. 2. In other embodiments, at least one of the sections ID0, ID1, ID2, and ID3 may correspond to a different and/or additional domains. In further embodiments, the underlay network address 220 may include two, three, five, or any other suitable number of sections. In yet further embodiments, the underlay network address 120 may also be arranged in a queue, a list, a set, or other suitable data structures. In yet other embodiments, the sections ID0, ID1, ID2, and ID3 may correspond to a physical location associated with an end point in the computer network.

Figure 6:
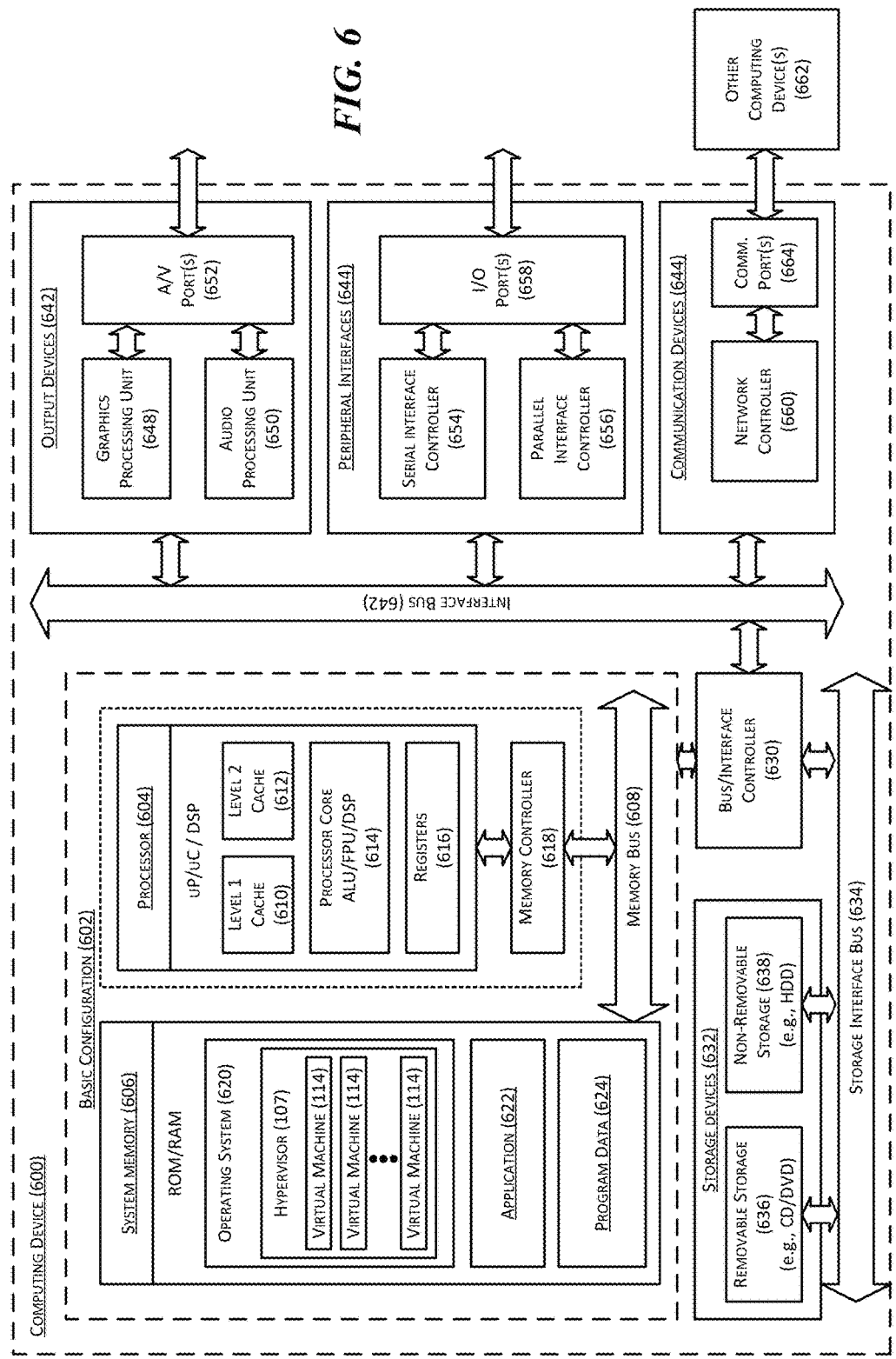
FIG. 6 is a computing device suitable for certain components of the computer network in FIG. 1.

FIG. 6 is a computing device 600 suitable for certain components of the computer network 100 in FIG. 1. For example, the computing device 600 can be suitable for the servers 102, or the overlay network resource manager 126 of FIG. 1. In a very basic configuration 602, computing device 600 typically includes one or more processors 604 and a system memory 606. A memory bus 608 can be used for communicating between processor 604 and system memory 606.

Depending on the desired configuration, the processor 604 can be of any type including but not limited to a microprocessor (µP), a microcontroller (µC), a digital signal processor (DSP), or any combination thereof. The processor 604 can include one more levels of caching, such as a level-one cache 610 and a level-two cache 612, a processor core 614, and registers 616. An example processor core 614 can include an arithmetic logic unit (ALU), a floating point unit (FPU), a digital signal processing core (DSP Core), or any combination thereof. An example memory controller 618 can also be used with processor 604, or in some implementations memory controller 618 can be an internal part of processor 604.

Depending on the desired configuration, the system memory 606 can be of any type including but not limited to volatile memory (such as RAM), non-volatile memory (such as ROM, flash memory, etc.) or any combination thereof. The system memory 606 can include an operating system 620, one or more applications 622, and program data 624. As shown in FIG. 6, the operating system 620 can include a hypervisor 107 for managing one or more virtual machines 114. This described basic configuration 602 is illustrated in FIG. 6 by those components within the inner dashed line.

The computing device 600 can have additional features or functionality, and additional interfaces to facilitate communications between basic configuration 602 and any other devices and interfaces. For example, a bus/interface controller 630 can be used to facilitate communications between the basic configuration 602 and one or more data storage devices 632 via a storage interface bus 634. The data storage devices 632 can be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 606, removable storage devices 636, and non-removable storage devices 638 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 600. Any such computer readable storage media can be a part of computing device 600. The term "computer readable storage medium" excludes propagated signals and communication media.

The computing device 600 can also include an interface bus 640 for facilitating communication from various interface devices (e.g., output devices 642, peripheral interfaces 644, and communication devices 646) to the basic configuration 602 via bus/interface controller 630. Example output devices 642 include a graphics processing unit 648 and an audio processing unit 650, which can be configured to communicate to various external devices such as a display or speakers via one or more A/V ports 652. Example peripheral interfaces 644 include a serial interface controller 654 or a parallel interface controller 656, which can be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which can be arranged to facilitate communications with one or more other computing devices 662 over a network communication link via one or more communication ports 664.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for migrating a virtual machine in a computer network having an overlay network implemented over an underlay network having a plurality of network nodes arranged into hierarchical domains, the method comprising:
   receiving an indication to migrate the virtual machine from an originating network node to a target network node in the underlay network, the virtual machine having a network address in the overlay network;
   determining a network path from the originating network node to the target network node based at least in part on a label associated with the target network node in the underlay network, the label corresponding to the network path traversing one or more of the network nodes of the underlay network between the originating network node and the target network node;
   migrating the virtual machine from the originating network node to the target network node following the determined network path through the hierarchical domains of the underlay network while maintaining the network address of the migrated virtual machine in the overlay network; and
   forwarding, from the originating network node to the target network node, messages destined to the network address of the virtual machine following the same determined network path in the underlay network through which the virtual machine is migrated for a period of time subsequent to migrating the virtual machine from the originating network node to the target network node.

2. The method of claim 1 wherein determining the network path includes determining a section of the network path from the originating network node in a domain of the underlay network to an intermediate network node in a higher-level domain of the underlay network based on the label.

3. The method of claim 1 wherein determining the network path includes determining a first section of the network path from the originating network node in a domain of the underlay network to an intermediate network node in a higher-level domain of the underlay network; and determining a second section of the network path from the intermediate network node in the higher-level domain to the target network node in a lower-level domain of the underlay network based on the label.

4. The method of claim 1, further comprising removing the network path after the period of time expires.

5. The method of claim 1, further comprising forwarding additional messages from the originating network node to the target network node during migration of the virtual machine from the originating network node to the target network node.

6. A method for migrating a virtual machine in a computer network having an overlay network implemented over an underlay network, the method comprising:
   receiving packets associated with migrating the virtual machine from an originating network node of the underlay network to a target network node of the underlay network, the received packets individually including a label associated with a network path from the originating network node to the target network node in the underlay network, wherein the virtual machine has a network address in the overlay network;
   in response to receiving the packets, examining the labels of the packets to determine the network path associated with the labels;
   forwarding the packets from the originating network node to the target network node following the determined network path in the underlay network based on the labels while maintaining the network address of the migrated virtual machine in the overlay network; and
   forwarding messages destined to the network address of the migrated virtual machine in the overlay network from the originating network node to the target network node along the same network path through which the packets associated with migrating the virtual machine are forwarded in the underlay network for a period of time subsequent to migrating the virtual machine from the originating network node to the target network node.

7. The method of claim 6 wherein the labels include label stacks arranged according to multi-protocol label switching protocol.

8. The method of claim 7 wherein forwarding the messages includes:

receiving the messages destined for the migrated virtual machine at the originating network node;
encapsulating the received messages with routing information identifying the established network tunnel; and
forwarding the encapsulated messages to the target network node following the network tunnel.

9. The method of claim 7 wherein forwarding the messages includes:
receiving the messages destined for the migrated virtual machine at the originating network node;
encapsulating the received messages with routing information identifying the established network tunnel, the routing information including the label corresponding to the established network tunnel; and
forwarding the encapsulated messages to the target network node following the network tunnel.

10. The method of claim 7 wherein forwarding the messages includes forwarding the messages destined for the migrated virtual machine for a period of time after the virtual machine is migrated to the target network node.

11. The method of claim 7, further comprising:
demolishing the network tunnel after the period of time expires.

12. A computing system having a processor and a memory containing instructions that when executed by the processor, cause computing system to:
receive, at an originating network node of a computing network, a packet associated with a virtual machine that is to be migrated from the originating network node of a underlay network to a target network node of the underlay network, the computer network having an overlay network implemented over an underlay network having a plurality of network nodes arranged into hierarchical domains, wherein the virtual machine has a network address in the overlay network;
in response to receiving the packet, identify a network path in the underlay network from the originating network node to the target network node;
forward the packet from the originating network node to another network node in the underlay network following the identified network path while maintaining the network address of the migrated virtual machine in the overlay network; and
forward, from the originating network node to the target network node, messages destined to the network address of the migrated virtual machine in the overlay network following the same identified network path through which the packet associated with the migrated virtual machine is transmitted for a period of time subsequent to migrating the virtual machine from the originating network node to the target network node.

13. The computing system of claim 12 wherein the network path includes a network tunnel from the originating network node to the target network node in the underlay network, the network tunnel traversing one or more of the hierarchical domains in the underlay network.

14. The computing system of claim 12 wherein the network path includes a network tunnel from the originating network node to the target network node in the underlay network, and wherein the network tunnel is pre-established in the underlay network.

15. The computing system of claim 12 wherein to identify the network path includes to identify one or more network nodes in one or more of the hierarchical domains in the underlay network.

16. The computing system of claim 12 wherein to identify the network path includes to identify a physical location of the target network node in the hierarchical domains of the underlay network.

17. The computing system of claim 12 wherein the memory contains additional instructions executable by the processor to cause the computing system to forward additional messages from the originating network node to the target network node during migration of the virtual machine.

18. The computing system of claim 12 wherein the memory contains additional instructions executable by the processor to cause the computing system to forward additional messages from the originating network node to the target network node during migration of the virtual machine from the originating network node to the target network node.

19. The computing system of claim 12 wherein the memory contains additional instructions executable by the processor to cause the computing system to forward additional messages from the originating network node to the target network node during migration of the virtual machine from the originating network node to the target network node and to demolish the network tunnel after the period of time expires.

20. The computing system of claim 12 wherein memory contains additional instructions executable by the processor to cause the computing system to terminate forwarding the messages after the period of time is expired and demolish the network tunnel after the period of time expires.

* * * * *